Nov. 13, 1928.  1,691,547
E. P. FARUM ET AL
COMBINED BUMPER AND LUGGAGE CARRIER
Filed Jan. 5, 1925
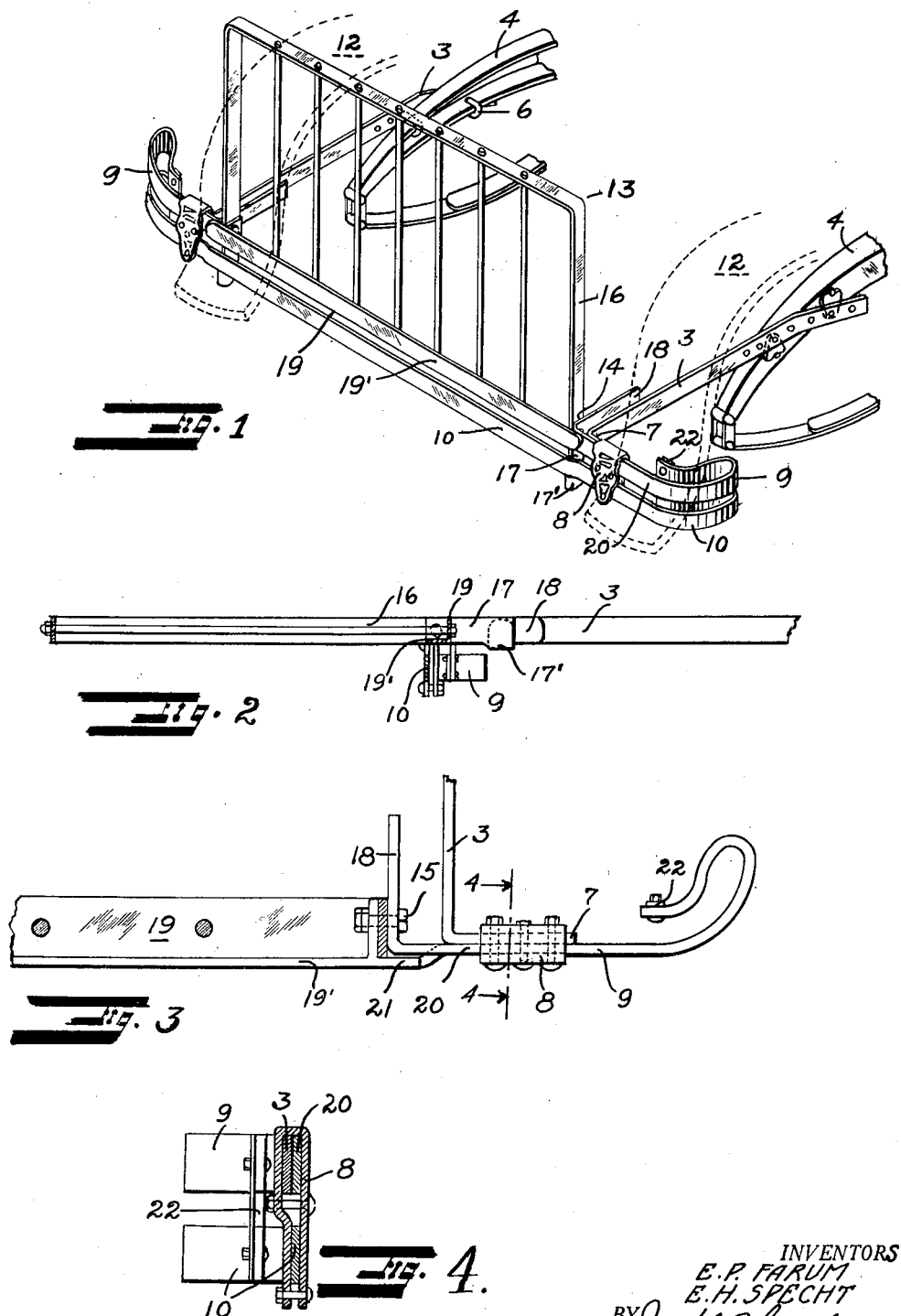
INVENTORS
E. P. FARUM
E. H. SPECHT
BY Joseph B. Gardner
ATTORNEY.

Patented Nov. 13, 1928.

1,691,547

UNITED STATES PATENT OFFICE.

ELECIE P. FARUM AND EDWARD H. SPECHT, OF OAKLAND, CALIFORNIA, ASSIGNORS TO OAKLAND MACHINERY COMPANY, OF OAKLAND, CALIFORNIA, A CORPORATION OF CALIFORNIA.

COMBINED BUMPER AND LUGGAGE CARRIER.

Application filed January 5, 1925. Serial No. 517.

The invention relates to a structure attachable to the rear end of an automobile for the purpose of carrying luggage and protecting the automobile against rear collisions. More particularly the invention relates to devices of this type which are adjustable to fit different makes of automobiles, and in which the carrier is foldable and forms a part of the bumper.

An object of the invention is to provide a combined carrier and bumper of the type described which will have greater structural strength and afford better protection against collisions than the devices heretofore constructed.

Another object of the invention is to provide a combined bumper and carrier in which the bumper and carrier appear as separate units but are in fact structurally and functionally united.

A further object of the invention is to provide a device of the character described which is extremely well appearing.

The invention possesses other objects and features of advantage, some of which, with the foregoing, will be set forth in the following description of the preferred form of our invention which is illustrated in the drawings accompanying and forming part of the specification. It is to be understood that we do not limit ourselves to the showing made by the said drawings and description, as we may adopt variations of the preferred form within the scope of our invention as set forth in the claims.

Referring to said drawings:

Figure 1 is a perspective view of the device shown in folded position and secured to the rear end of an automobile.

Figure 2 is a vertical sectional view of the portion of the structure shown in Figure 1, with the carrier in extended or operative position.

Figure 3 is a fragmentary horizontal section of the device in folded position.

Figure 4 is a vertical sectional view of the bumper and adjustable attaching portion of the device, the plane of the section being indicated by the line 4—4 of Figure 3.

As previously stated the device of our invention is particularly adapted for attachment to the rear end of an automobile, and in its present form, comprises a pair of brackets 3 which are arranged to be secured to the frame members of the automobile. As here shown the brackets are secured adjacent their forward ends to the longitudinal frame members 4 by means of J-bolts 6. The rear ends of the brackets are preferably formed with short angular extensions 7 which extend outwardly from each other and transversely of the automobile.

Secured to the extensions 7 by means of clamps 8 for transverse adjustment relative to the brackets, are bumper portions or wings 9 and a bumper 10. The portions 9 are arranged to lie directly in the rear of the hind fenders 12 of the automobile, while the bumper 10 is positioned in spaced relation directly below the portions 9 and extends completely across the automobile.

Interposed between the bumper wings 9 is a luggage carrier rack or frame 13 preferably of rectangular form and pivotally connected adjacent the ends of one of its longer sides to the inner ends 14 of the wings. The rack is preferably made of a standard size, and owing to the adjustable positioning of the wings in the clamps said clamps may be moved toward or from each other and set to accommodate the rack between them. Since the bumper 10 is arranged in the present embodiment to be held in fixed relation to the wings, adjusting the relation of wings 9 and brackets, will, of course serve to effect corresponding adjustment in the relation of the bumper 10 and brackets. It will thus be clear that the device may be made of a standard size and form and attached to different makes and sizes of automobiles without the use of special parts.

The rack is connected to the bumper portions 9 by means of pivot bolts 15, and is adapted to be held in the vertical or folded position shown in Figure 1, or swung from such position to the horizontal or extended position shown in Figure 2. The end members 16 of the rack are preferably provided with extensions 17 having hooks 17' which are arranged to abut and frictionally engage forward extensions 18 of the wings when the rack is extended. It is to be noted that the lower side member 19 of the rack is substantially aligned with the straight portion 20 of the wings. Thus when the rack is in vertical position, the side member 19 and wings form a substantially continuous bar extending completely across the rear of the vehicle and parallel to the bumper bar 10. To enhance the effect of the continuity of the portions 9 and member 19, both from the standpoint of appearance and strength, the member 19 is provided with a flange 19' which is of the same width as the portions 9, which when the rack is disposed in folded position, lies substantially vertically and horizontally aligned with the wings. The flange 19' in effect forms a rotatable bumper and the ends 21 thereof preferably extend beyond the ends of the rack so that when the rack is in folded position, said ends 21 cover and to a certain extent reenforce the joint between the rack and wings.

The wings and bumper 10 in addition to being secured together by the clamps 8, are preferably fixedly attached together at their outer extremities by means of straps 22, and since, as previously noted, the bumper 10 is formed of a continuous bar and lies across the joint between the wings and rack, it serves as a most effective stiffening means for rack and wings structure and protects the joints thereof.

The flange 19' of the rack, as here shown, lies somewhat to the rear of the adjacent portions of the wings, and particularly for this reason, the bar 10 is formed slightly offset. In this manner the various portions of the latter may be vertically aligned with the flange and wings, and the clamping together of the wings and bar will be considerably facilitated.

We claim:

1. In a combined bumper and luggage carrier for automobiles, a pair of brackets adapted to be secured to the automobile, bumper extremities secured to said brackets and spaced transversely of the automobile, a pivotally mounted luggage carrier member interposed between said extremities, and a bumper secured to said extremities extending substantially from one to the other.

2. In a device of the character described, bumper portions arranged to be spaced transversely of the automobile at the rear thereof, a pivotally mounted luggage carrier member positioned inwardly of said bumper portions, and a bumper extending adjacent said bumper portions and said carrier member.

3. In a device of the character described, bumper portions arranged to be spaced transversely of the automobile at the rear thereof, a luggage carrier member mounted for movement relative to said portions and positioned inwardly thereof, and a continuous bumper fixed to said portions and extending transversely of the automobile adjacent said portions and said carrier member.

4. In a device of the character described bumper portions arranged to be spaced transversely of the automobile at the rear thereof, a luggage carrier pivotally mounted between said portions and forming therewith a substantially continuous guard across the automobile, and a bumper bar secured adjacent its ends to said bumper portions and arranged to extend substantially parallel with said portions and said carrier.

5. In a device of the character described, a bumper member extending transversely of the automobile at an end thereof, a pivotally mounted luggage-carrier member connected to said bumper member and aligned therewith transversely of the automobile, and a bumper bar extending transversely of the automobile in parallel relation to said members and being continuous at the portion opposite and adjacent the adjoining ends of said members.

6. In a device of the character described, a pair of bumper portions arranged to be spaced transversely of the automobile at the rear thereof, a luggage rack pivotally carried between said bumper portions and having a cross member aligned transversely of the automobile with said portions to form a substantially continuous guard across the automobile, a continuous bumper bar substantially vertically aligned with said rack member and portions and extending parallel thereto, and connecting means between said bumper portions and bumper bar.

7. In a device of the character described, a pair of bumper portions of substantially rectangular cross sections arranged to be spaced transversely of the automobile at the rear thereof and positioned with the wider faces vertical, and a luggage carrier arranged between said portions movable to and from an extended position and having a cross bar with sides substantially corresponding to the sides of said bumper portions arranged to lie in substantially coplanar relation to the corresponding sides of said portions when the carrier is in a retracted position.

8. In a device of the character described a pair of bumper portions arranged to be spaced transversely of the automobile at the rear thereof, and a luggage carrier rack mounted between said portions for movement to and from an extended position and having a cross bar arranged to form with said portions a substantially continuous guard across the automobile and having end portions overlapping the inner ends of said bumper portions.

9. In a device of the character described, a pair of bumper portions arranged to be positioned at the rear of the automobile in transversely spaced relation thereto and mounted for adjustment toward and from each other, a luggage carrier rack pivotally connected at its opposite ends to said bumper portions, a transversely disposed continuous bumper bar extending adjacent said portions and rack and terminating adjacent the outer ends of said bumper portions, and means connecting the inner ends of said portions to the corresponding ends of said bar.

10. In a device of the character described, a pair of brackets adapted to be secured to an automobile, bumper extremities mounted on said brackets, a member of fixed length arranged to be secured at its ends to and between said bumper extremities, and means permitting the adjustable positioning of said bumper extremities with respect to said brackets whereby said member may be secured to said bumper extremities.

In testimony whereof, we have hereunto set our hands at Oakland, California, this 16th day of October, 1924.

ELECIE P. FARUM.
EDWARD H. SPECHT.